United States Patent [19]

Sundquist

[11] Patent Number: 5,383,613
[45] Date of Patent: Jan. 24, 1995

[54] SCRAPER ARRANGEMENT PERTAINING TO FOOD PROCESSORS

[75] Inventor: Jarl Sundquist, Sollentuna, Sweden

[73] Assignee: AB Hällde Maskiner, Kista, Sweden

[21] Appl. No.: 65,392

[22] Filed: May 21, 1993

[30] Foreign Application Priority Data

May 22, 1992 [SE] Sweden .............................. 9201627-8

[51] Int. Cl.⁶ .............................................. B02C 19/08
[52] U.S. Cl. ...................................... 241/37.5; 241/92;
241/166; 241/199.12
[58] Field of Search ............. 241/37.5, 92, 166, 169.1,
241/199.12, 282.1, 282.2

[56] References Cited

U.S. PATENT DOCUMENTS

| | | | |
|---|---|---|---|
| 2,200,035 | 5/1940 | Meyer | 241/199.12 |
| 3,313,332 | 4/1967 | Stephan et al. | 241/166 X |
| 3,434,518 | 3/1969 | Motis | 241/199.12 |
| 4,878,627 | 11/1989 | Otto | 241/199.12 |
| 5,221,055 | 6/1993 | Kuan | 241/199.12 |

FOREIGN PATENT DOCUMENTS

| | | | |
|---|---|---|---|
| 1208148 | 9/1959 | France | 241/199.12 |
| 2605207 | 4/1988 | France | |
| 1044659 | 11/1958 | Germany | 241/199.12 |
| 324044 | 5/1970 | Sweden | |

Primary Examiner—Timothy V. Eley
Attorney, Agent, or Firm—Nies, Kurz, Bergert & Tamburro; Philip E. Kurz

[57] ABSTRACT

The present invention thus relates to a scraping arrangement in food processors of the kind in which the processor is a cutting appliance which cuts or chops the foodstuffs to be prepared, and which includes a container (2) fitted with a lid (3) which has an inlet opening (4) through which foodstuffs can be introduced into the container as the appliance operates, wherein the container (2) is stationary while the appliance operates and in which rotating cutting means are located above the container bottom. The invention is characterized in that the scraper arrangement (1) includes two or more scrapers (6-9) which are attached to an annulus (10) which is intended to be placed in the upper part of the container (2) with the scrapers extending down from the annulus along the inner surface of the container; in that the annulus (10) includes radially and outwardly extending projections (11-13) which are intended to be located between the lid (3) and the upper container edge (14); and in that the lid (3) includes downwardly directed shoulders (15-17) which are intended to lie against the upper container edge (14); and in that the shoulders (15-17) define therebetween a gap (18, 19) into which the radially directed projections (11-13) are intended to run when the annulus (10) is rotated relative to the container (2).

9 Claims, 2 Drawing Sheets

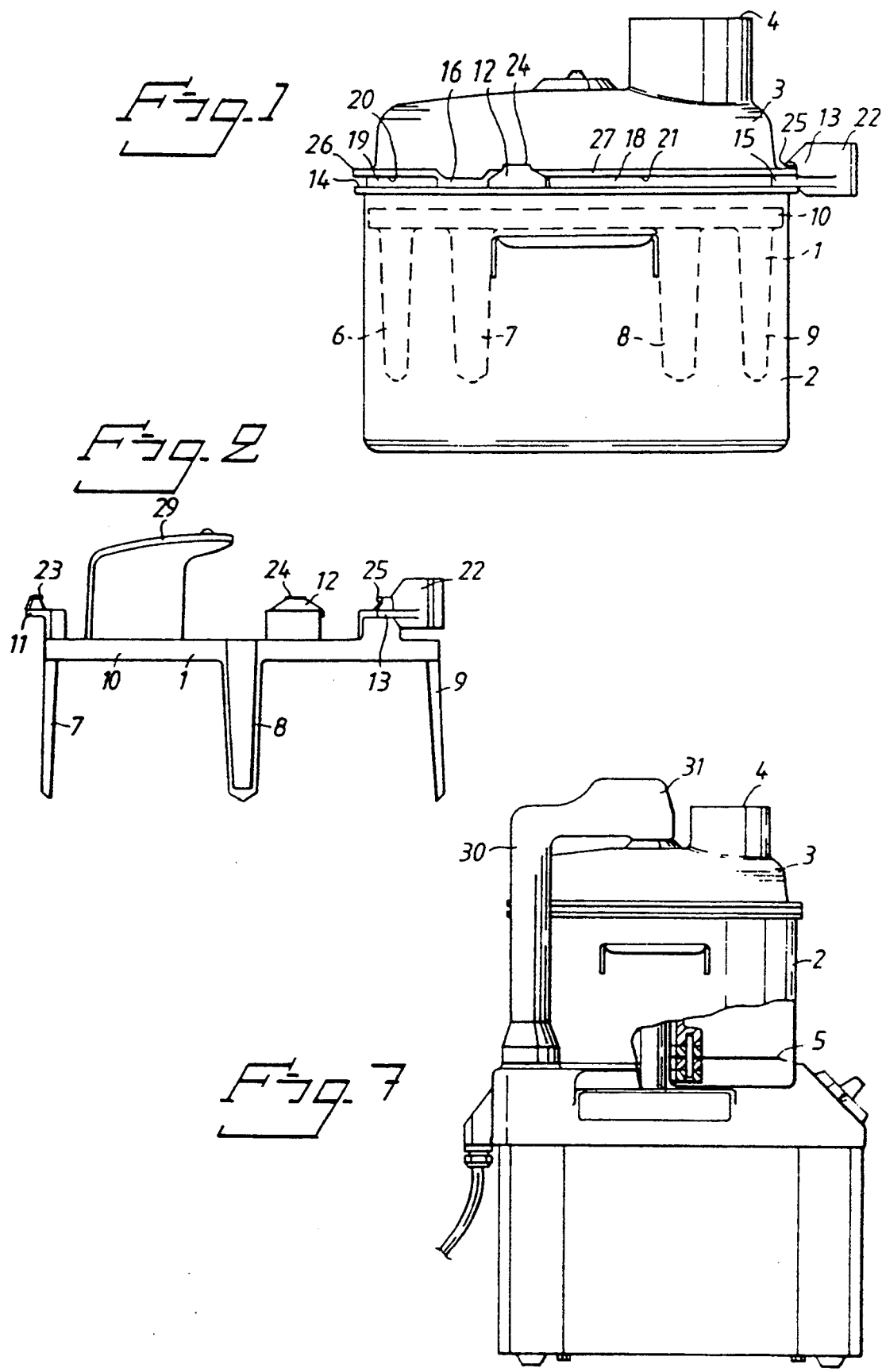

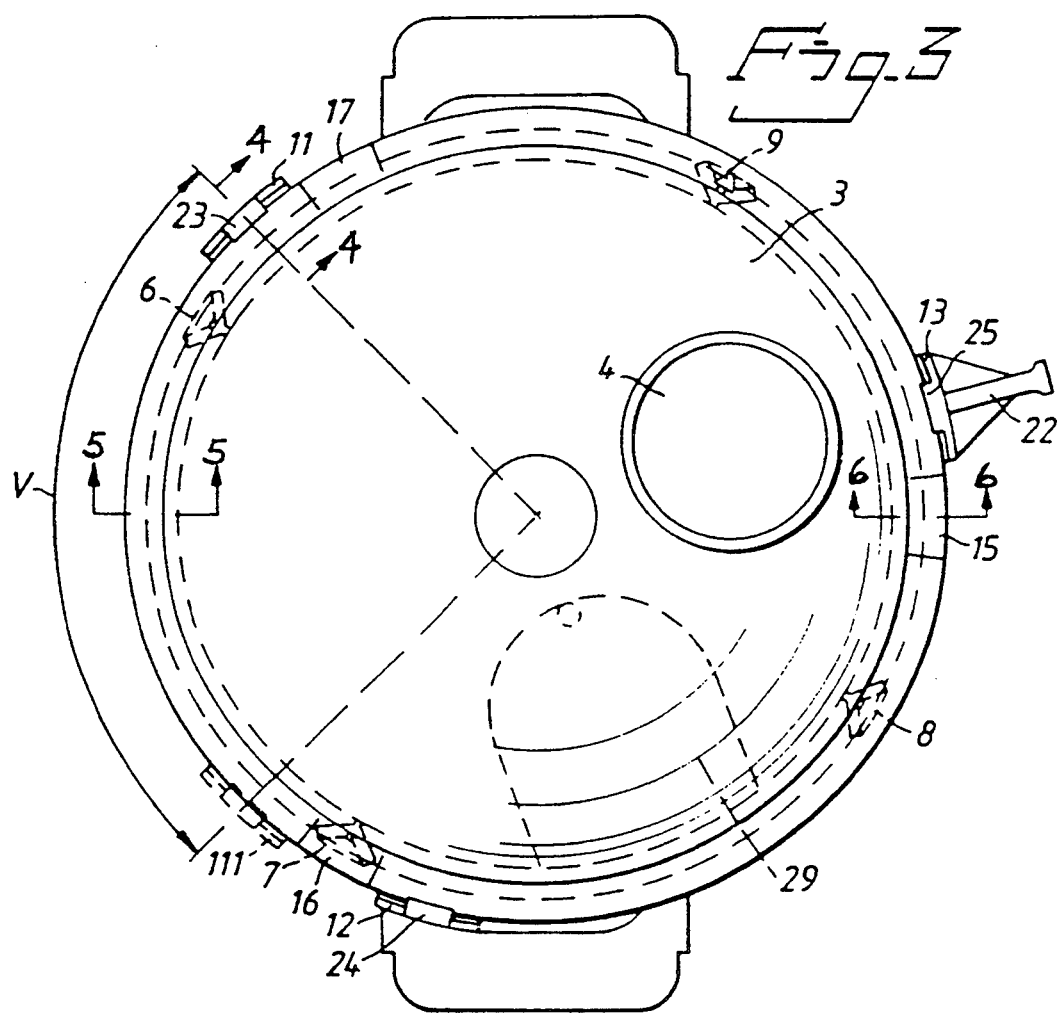
Fig. 3
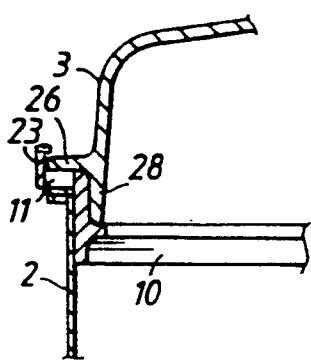
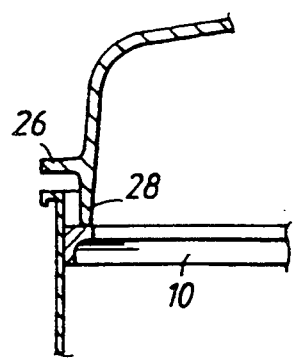
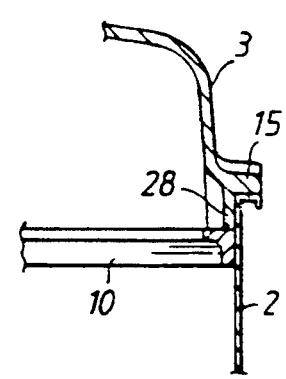
Fig. 4    Fig. 5    Fig. 6

SCRAPER ARRANGEMENT PERTAINING TO FOOD PROCESSORS

BACKGROUND OF THE INVENTION

The present invention relates to a scraper arrangement pertaining to food processors of the kind in which the processor is a cutting appliance for cutting or chopping, hacking, the foodstuffs to be prepared.

Such appliances are available for use in large commercial kitchens and also for use in domestic kitchens.

One common feature of such appliances is that they include a container which is fitted with a lid, and that the lid is provided with an inlet opening through which the foodstuffs can be inserted into the container while the appliance is at work. The container bottom has an upstanding tube through which a drive shaft extends. Fitted to the shaft is a cutter which includes a sleeve which runs on the upstanding tube and the bottom end of which carries the cutting tool. The cutting tool may consist of one or more knives which extend radially from the sleeve. The cutting tool may also include cutting discs, of varying kinds.

When the appliance is being used, the container is stationary while the cutting tool rotates. The lid must be in position on the container, before the appliance can be started and used.

FIELD OF THE INVENTION

One problem with appliances of this kind is that when a foodstuff, for instance a leaf vegetable or a root vegetable is pushed down through the container inlet opening and disintegrated by the cutting tool, the disintegrated foodstuff is thrown out onto the vertical container walls and sticks thereto. This also applies, for instance, to sauce ingredients or dough ingredients introduced into the container through its inlet opening.

As the ingredients are introduced into the container and come into contact with the rapidly rotating cutting tool, the ingredients are thrown vigorously onto the container walls.

SUMMARY OF THE INVENTION

There is thus a need to be able to scrape the inner surfaces of the container wall as the appliance operates. One problem in this respect is that the lid cannot be removed, because removal of the lid will result in the stopping of the appliance.

This problem is solved by the present invention, which provides an arrangement by means of the inner surface of the container can be scraped clean as the appliance operates.

OBJECTS OF THE INVENTION

The present invention thus relates to a scraping arrangement in food processors of the kind in which the processor is a cutting appliance which cuts or chops the foodstuffs to be prepared, and which includes a container fitted with a lid which has an inlet opening through which foodstuffs can be introduced into the container as the appliance operates, wherein the container is stationary while the appliance operates and in which rotating cutting means are located above the container bottom, and is characterized in that the scraper arrangement includes two or more scrapers which are attached to an annulus which is intended to be placed in the upper part of the container with the scrapers extending down from the annulus along the inner surface of the container; in that the annulus includes radially and outwardly extending projections which are intended to be located between the lid and the upper container edge; and in that the lid includes downwardly directed shoulders which are intended to lie against the upper container edge; and in that the shoulders define therebetween a gap into which the radially directed projections are intended to run when the annulus is rotated relative to the container.

BRIEF DESCRIPTION OF THE DRAWING

The invention will now be described in more detail with reference to exemplifying embodiments thereof and also with reference to the accompanying drawings, in which FIG. 1 is a side view of a container fitted with a scraper arrangement in accord with my invention;

FIG. 2 is a perspective view of the scraper subassembly portion of the arrangement;

FIG. 3 is a top plan view of a container fitted with the scraper arrangement and includes a lid;

FIG. 4 is a sectional view taken along the line 4—4 in FIG. 3;

FIG. 5 is a sectional view taken along the line 5—5 in FIG. 3;

FIG. 6 is a sectional view taken along the line 6—6 in FIG. 3; and

FIG. 7 illustrates a food processor of a kind with which the invention is intended for use.

DESCRIPTION OF THE PREFERRED EMBODIMENTS

FIGS. 1 and 2 illustrate an inventive scraper arrangement 1. The scraper arrangement 1 is intended for food processors, see FIG. 7, of the kind in which the processor is a cutting appliance which cuts or chops the foodstuffs to be prepared, and which includes a container 2 fitted with a lid 3 which is provided with an inlet opening 4 through which the foodstuffs can be introduced into the container as the appliance operates. The container 2 is stationary while the appliance is at work. Located above the container bottom is a rotary cutting means 5. The food processor illustrated in FIG. 7 is provided with an arm 30 having a head 31 which must be swung in over the container lid before the appliance can be started. Many different kinds of such food processors are commercially available. The invention can be applied to all known food processor designs. With regard to appliances of this kind intended for large commercial kitchens, the appliances are normally used to chop and disintegrate foodstuffs, such as root vegetables for instance.

In accordance with the invention, the scraper arrangement 1 includes two or more elongate scrapers 6-9 which are attached to an annulus 10 which is intended to be placed in the upper part of the container 2, with the elongate scrapers 6-9 extending down from the annulus 10 and adjacent the inner annular wall surface of the container, as illustrated in FIG. 1.

FIG. 2 shows the actual scraper arrangement, removed from the container, for the sake of illustration. The annulus 10 includes radially directed projections 11, 12 and 13 which are intended to be located between the lip 3 and the upper edge or lid 14 of the container 2. These projections thus rest on the lip of the container, and the height position of the annulus 10, and therewith the height position of the scrapers in the container will be determined by the height position of the projections in relation to the annulus. The arrangement may include two scrapers, although preferably at least three scrapers are provided.

As will also be seen from FIGS. 1 and 3, the lid 3 of the processor container includes downwardly extending shoulders 15, 16 and 17 which are intended to abut and lie against the container lip 14. Defined between pairs of these shoulders 15–17 is a gap or slot 18, 19 located between the container lip 14 and the edge 20, 21 of the lid 3 and extending between pairs of the shoulders. As will best be seen from FIG. 2, the radially directed projections 11–13 are intended to fit in and slide within associated one of the gaps 18, 19, etc. as the annulus 10 is rotated relative to the container 2.

When the annulus, or more specifically the scraper arrangement shown in FIG. 2, is rotated in the plane of the annulus relative to the container, the scrapers 6, 9 will therewith slide against the inner surface of the container and scrape away foodstuff that has adhered to said surface.

Because the projections 11, 12, 13 slide in associated gaps 18, 19, etc., the scraper arrangement can be rotated while the container and the lid are both stationary, by moving projections 11–13 backwards and forwards in the gap 18, 19 in which the projections are slidably disposed.

According to one preferred embodiment, however, one of the projections 13 is provided with a manoeuvering manual operations device 22 which projects radially out from the annulus, this manoeuvering manual operating device preferably having the form of an outwardly projecting wing-like part or grip tab 22 (as seen in FIGS. 1 and 2) which is intended to be moved forwards and backwards manually in an arcuate path around the peripheral edge of the lid and concurrently rotates the scraper arrangement 1 in an arcuate path.

The wing-like gripping tab 22 projecting radially from the annulus is preferably an integral part of one of said radially directed projections.

However, if desired, and if the construction of the appliance will allow, the lid 3 can be rotated so that the projections 11–13 will abut with respective shoulders 15–17 and therewith be dogged as the lid rotates relative to the container.

According to a greatly preferred embodiment of the invention, two or more of the radially directed projections 11–13 are provided with an attachment means, such as a hook 23, 24 and 25 (see FIG. 2) by means of which the annulus can be detachedly connected to the lid 3. In this case, the hooks 23–25 engage with an outwardly projecting flange 26–27 on the lid, between the lid shoulders. The scraper arrangement is preferably constructed from a high-grade plastic material, although it may also conceivably be made of metal. In both instances, the annulus, the projections and the hooks are dimensioned so that the hooks can be readily sprung outwards, so as to enable the scraper arrangement to be removed from the lid. This is appropriately done when the processor components are to be washed.

Furthermore, an advantage is afforded when it is possible to choose whether the scraper arrangement shall be fitted to the processor or not, depending on the foodstuff to be prepared.

FIGS. 4, 5 and 6 illustrate different sectional views of the FIG. 3 illustration, with the intention of illustrating one embodiment of the invention more clearly.

The scrapers 6, 7, 8 and 9 themselves may have any configuration suitable for the intended purpose. In FIG. 3, the scrapers have a V-shaped cross-section, with the free ends of the V running against the inner container wall. In this embodiment, the scrapers will have the same function irrespective of the direction in which they are moved by the manoeuvering device 22.

It was mentioned earlier that as the annulus is rotated backwards and forwards, each projection moves between two adjacent shoulders on the lid. This means that the annulus has a limited angle of rotation V, see FIG. 3, which is determined by the number of projections 11, 12 and 13 and their positions, and also by the number of shoulders 15, 16, 17 and their positions.

The number of scrapers is chosen on the basis of this limited angle of rotation, so that the number of scrapers in combination with the positioning of the scrapers along the tangential direction of the annulus will cause scraping to be effected by the total group of scrapers 6–9 along the whole of the inner surface of the container as seen peripherally, as the projections move between two adjacent shoulders on the lid.

According to one preferred embodiment, the number of scrapers and their mutual positions is such that as the radially directed projections move between two adjacent shoulders on the lid, with corresponding rotation of the annulus relative to the container, the total number of scrapers will together move around at least one full turn of the container.

According to one greatly preferred embodiment, namely the embodiment illustrated in the Figures, the scraper arrangement includes four scrapers 6–9 which are spaced mutually equidistantly in the tangential direction of the annulus 10. Furthermore, the arrangement includes three shoulders 23–25 on the lid 3, these shoulders being placed mutually equidistantly in the tangential direction of the lid 3.

FIG. 3 illustrates the rotational angle V and the two limit positions of the projection 11 between the adjacent shoulders 16, 17, where the projection 11 is referenced 11 at its one limit position and is referenced 111 at its other limit position, shown in broken lines.

It will be evident that the number of scrapers and their positions, the number of projections and their positions, and the number of shoulders and their positions can be varied in many ways, where all variations provide a well-functioning arrangement.

For instance, each of the scrapers may comprise a short stem which extends down from the annulus 2 and from which there extends two or more vertical parts, each corresponding to the vertical parts of the scrapers shown in FIG. 2, said vertical parts being parallel to and spaced from one another in the tangential direction of the annulus. The scrapers of this embodiment will each scrape clean a larger angular area of the container inner wall than that corresponded by the angle of rotation V.

The main purpose of the shoulders 15–17 is to form the arcuate slots 18–19, so as to enable the projections to move freely in the slots, and therewith minimize the frictional forces acting between the projections and the upper container lip and the bottom edge of the lid respectively. These frictional forces would be much greater if the lid were to rest with the whole of its weight on the projections.

The projections are therefore given a smaller height than the height of the slot. Furthermore, the outer diameter of the annulus is made slightly smaller than the inner diameter of the container, for friction reasons.

A gap shall therefore be found between the lid and the upper container edge. In order to prevent food stuff from exiting from the container as the foodstuff is processed, a collar 28 is preferably provided circumferentially around the bottom part of the lid, said collar having a height such that the bottom edge of the collar will lie against, or be located very close to the upper surface of the annulus 10 when the lid is fitted to the container, see FIG. 4–6.

According to one preferred embodiment of the invention, the annulus 10 is provided with a wing-like curved plate part 29 which projects upwards and inwarde in the use position of the scraper arrangement 1, as shown in FIGS. 2 and 3. This wing-like curved plate part 29 is configured and arranged so that in a predetermined rotational position of the annulus 10 relative to the lid 3, the wing-like curved plate part will overlap the inlet opening 4 in the lid on the underside of said lid. When the annulus shown in FIG. 3 is turned through roughly one-quarter (¼) turn in an anti-clockwise direction, the wing-like curved part part 29 will overlap and close the inlet opening 4.

When the container wall is not being scraped, the annulus is conveniently turned so that the inlet opening will be covered in the aforesaid manner and therewith prevent material from escaping from the container. This is achieved in FIG. 3 when the annulus is rotated by the manoeuvering device to a position in which the projection 11 takes its second limit position 111.

It will be obvious that the present invention can be achieved in many ways without departing from its function.

The present invention shall not therefore be considered restricted to the aforedescribed exemplifying embodiments thereof, since variations can be made within the scope of the following claims.

I claim:

1. A scraper arrangement for use in combination with food processors of the kind in which the processor is a cutting appliance which cuts or chops the foodstuffs to be prepared, and which includes a container (2) having an upper peripheral edge and the container is fitted with a lid (3) which has a peripheral edge and an inlet opening (4) through which foodstuffs can be introduced into the container as the appliance operates, and wherein the container (2) is stationary while the applicance operates and in which rotating cutting means are located above the container bottom, said scraper arrangement (1) comprising: an annulus and at least two elongate scrapers (6–9) attached to and depending from said annulus (10) in annular spaced-apart arrangement, said annulus being adapted to be placed in the upper part of the container (2) with the elongate scrapers extending down from the annulus and adjacent the inner surface of the container; said annulus (10) including radially outwardly extending projections (11–13) adapted to be located between said lid (3) and the upper peripheral edge (14) of the container; and wherein the lid (3) includes downwardly directed shoulders (15–17) which when said lid is on the container, lie against the upper peripheral container edge (14); and wherein said shoulders (15–17) define therebetween and between the lid and said upper peripheral container edge, arcuate slots in which the radially directed projections (11–13) are disposed and will slide when the annulus (10) is rotated relative to the container (2).

2. A scraper arrangement according to claim 1, wherein at least two of said radially directed projections (11–13) are provided with attachment means (23–25) enabling the annulus (10) to be detachably connected to the lid (3).

3. A scraper arrangement according to claim 1, further including, a manual operating device (22) projecting radially from the annulus (10), said manual operating device being adapted to be moved with said annulus backwards and forwards manually around said peripheral edge of the lid (3).

4. A scraper arrangement as defined in claim 3, wherein said manual operating device is a wing-shaped gripping tab.

5. A scraper arrangement according to claim 4, wherein the manual operating device (22) is an integral part of one (13) of said radially directed projections.

6. A scraper arrangement according to claim 1, wherein the number of said elongate scrapers (6–9) and their associated positions on said annulus is such that, as the radially directed projections (11–13) are moved arcuately in said slots between two mutually adjacent shoulders (15–17) on the lid, with corresponding rotation of the annulus relative to the container, all of the elongate scrapers (6–9) will provide a total movement path at least covering one complete internal circumference of the container (2).

7. A scraper arrangement according to claim 1, wherein the peripheral edge of said lid has an outwardly projecting annular flange, and said radially directed projections (11–13) include hook means which are adapted to be releasably hooked onto said outwardly projecting flange (26, 27) on the lid (3).

8. A scraper arrangement according to claim 1, wherein the scraper arrangement includes four of said elongate scrapers (6–9) spaced-apart equidistantly around the annulus (10); and wherein said lid includes three of said shoulders (15–17) said shoulders being spaced-apart equidistantly around the peripheral edge of the lid.

9. A scraper arrangement according to claim 1, wherein a wing-shaped curved plate is carried on and projects upwardly and radially inwardly from the annulus (10) and which has a shape that can overlap the inlet opening (4) in the lid at the underside of said lid when the annulus (10) is assembled in the container and is rotated to a predetermined position relative to the lid (3).

* * * * *